US008157009B2

(12) United States Patent
Patil et al.

(10) Patent No.: US 8,157,009 B2
(45) Date of Patent: *Apr. 17, 2012

(54) CEMENT COMPOSITIONS AND ASSOCIATED METHODS COMPRISING SUB-MICRON CALCIUM CARBONATE AND LATEX

(75) Inventors: Rahul Chandrakant Patil, Pune (IN); Abhijit Tarafdar, Pune (IN); Abhimanyu Deshpande, Pune (IN); Christopher L. Gordon, Oklahoma City, OK (US)

(73) Assignee: Halliburton Energy Services Inc., Duncan, OK (US)

( * ) Notice: Subject to any disclaimer, the term of this patent is extended or adjusted under 35 U.S.C. 154(b) by 331 days.

This patent is subject to a terminal disclaimer.

(21) Appl. No.: 12/553,871

(22) Filed: Sep. 3, 2009

(65) Prior Publication Data

US 2011/0048709 A1     Mar. 3, 2011

(51) Int. Cl.
E21B 33/13 (2006.01)
E21B 33/14 (2006.01)
C04B 22/10 (2006.01)
C09K 8/467 (2006.01)

(52) U.S. Cl. ........ 166/293; 166/294; 166/295; 106/802; 106/817; 106/819; 106/823; 507/203; 507/219; 507/226; 507/231; 507/269; 523/130; 524/2; 524/8

(58) Field of Classification Search .................... None
See application file for complete search history.

(56) References Cited

U.S. PATENT DOCUMENTS

| | | |
|---|---|---|
| 2,805,719 A | 9/1957 | Anderson |
| 4,047,567 A | 9/1977 | Childs |
| 4,274,881 A | 6/1981 | Langton et al. |
| 4,321,243 A | 3/1982 | Cornwell et al. |
| RE31,190 E | 3/1983 | Detroit et al. |
| 4,385,935 A | 5/1983 | Skjeldal |
| 4,455,169 A | 6/1984 | Chatterji |
| 4,537,918 A | 8/1985 | Parcevaux et al. |
| 4,555,269 A | 11/1985 | Rao |
| 4,650,520 A | 3/1987 | Johnsen et al. |
| RE32,742 E | 9/1988 | Skjeldal |
| 4,935,060 A | 6/1990 | Dingsoyr |
| 4,961,790 A | 10/1990 | Smith |
| 5,102,558 A | 4/1992 | McDougall et al. |
| 5,121,795 A | 6/1992 | Ewert et al. |
| 5,123,487 A | 6/1992 | Harris et al. |
| 5,125,455 A | 6/1992 | Harris et al. |
| 5,127,473 A | 7/1992 | Harris et al. |
| 5,127,955 A | 7/1992 | Fry |
| 5,149,370 A | 9/1992 | Olaussen |
| 5,207,832 A * | 5/1993 | Baffreau et al. .............. 106/727 |
| 5,263,542 A | 11/1993 | Brothers |
| 5,339,903 A | 8/1994 | Eoff et al. |
| 5,346,012 A | 9/1994 | Heathman et al. |
| 5,355,954 A | 10/1994 | Onan |
| 5,372,641 A | 12/1994 | Carpenter |
| 5,373,901 A | 12/1994 | Norman |
| 5,375,661 A | 12/1994 | Daneshy et al. |
| 5,389,706 A | 2/1995 | Heathman et al. |
| 5,398,758 A | 3/1995 | Onan |
| 5,398,759 A | 3/1995 | Rodrigues et al. |
| 5,518,996 A * | 5/1996 | Maroy et al. .............. 507/100 |
| 5,769,939 A | 6/1998 | Dingsoyr |
| 5,783,541 A | 7/1998 | Tack et al. |
| 5,820,670 A | 10/1998 | Chatterji et al. |
| 6,098,711 A | 8/2000 | Chatterji et al. |
| 6,153,562 A | 11/2000 | Villar et al. |
| 6,171,386 B1 | 1/2001 | Sabins |
| 6,184,287 B1 | 2/2001 | Westerman |
| 6,227,294 B1 | 5/2001 | Chatterji |
| 6,365,647 B1 | 4/2002 | Westerman |
| 6,444,316 B1 | 9/2002 | Reddy |
| 6,488,764 B2 | 12/2002 | Westerman |
| 6,527,051 B1 | 3/2003 | Reddy |
| 6,554,071 B1 | 4/2003 | Reddy |
| 6,722,433 B2 | 4/2004 | Brothers et al. |
| 6,808,561 B2 | 10/2004 | Genge |
| 6,874,578 B1 | 4/2005 | Garnier et al. |
| 6,883,609 B2 | 4/2005 | Drochon et al. |
| 6,978,834 B1 | 12/2005 | Chatterji |
| 6,982,000 B2 | 1/2006 | Chatterji |
| 6,983,800 B2 | 1/2006 | Chatterji |
| 6,989,057 B2 | 1/2006 | Getzlaf |

(Continued)

FOREIGN PATENT DOCUMENTS

WO     WO 97/49644     12/1997

(Continued)

OTHER PUBLICATIONS

USPTO Office Action for U.S. Appl. No. 12/263,954 dated Apr. 20, 2011.
USPTO Office Action for U.S. Appl. No. 12/567,782 dated Apr. 25, 2011.
USPTO Office Action for U.S. Appl. No. 12/651,662 dated Apr. 22, 2011.
"Effect of the particle size on the micro and nanostructural features of calcium phosphate cement: a kinetic analysis", Biomaterials 25, 2004, pp. 3453-3462.
"Effect of Nano-SiO2 on heat of hydration of portland cement," Xu et al., Nanjing Gongye Daxue Xuebao, Ziran Kexeuban (2007), 29(4), 45-48, abstract only.

(Continued)

Primary Examiner — George Suchfield
(74) Attorney, Agent, or Firm — Craig W. Roddy; Tumey LLP

(57) ABSTRACT

Methods and compositions are provided that relate to cement compositions and methods comprising sub-micron calcium carbonate and latex. An embodiment includes a method of cementing in a subterranean formation. The method may comprise introducing a cement composition into the subterranean formation, wherein the cement composition comprises cement, water, sub-micron calcium carbonate, and latex. The method further may comprise allowing the cement composition to set in the subterranean formation. Another embodiment includes a cement composition that may comprise cement, water, a sub-micron calcium carbonate, and latex.

20 Claims, No Drawings

U.S. PATENT DOCUMENTS

| | | | |
|---|---|---|---|
| 7,013,998 B2 | 3/2006 | Ray | |
| 7,032,664 B2 | 4/2006 | Lord | |
| 7,033,975 B2 | 4/2006 | Baran et al. | |
| 7,036,592 B2 | 5/2006 | Nguyen | |
| 7,077,203 B1 | 7/2006 | Roddy et al. | |
| 7,081,489 B2 | 7/2006 | Chen | |
| 7,086,466 B2 | 8/2006 | Roddy | |
| 7,087,554 B2 | 8/2006 | Youngson | |
| 7,156,174 B2 * | 1/2007 | Roddy et al. | 166/293 |
| 7,178,590 B2 | 2/2007 | Vargo | |
| 7,204,312 B2 | 4/2007 | Roddy | |
| 7,213,646 B2 | 5/2007 | Roddy | |
| 7,267,174 B2 | 9/2007 | Gonsveld et al. | |
| 7,488,705 B2 | 2/2009 | Reddy et al. | |
| 7,559,369 B2 | 7/2009 | Roddy et al. | |
| 7,784,542 B2 | 8/2010 | Roddy et al. | |
| 7,806,183 B2 | 10/2010 | Roddy et al. | |
| 2002/0073894 A1 | 6/2002 | Genge et al. | |
| 2003/0168215 A1 | 9/2003 | Drochon et al. | |
| 2003/0220204 A1 | 11/2003 | Baran et al. | |
| 2003/0234103 A1 | 12/2003 | Lee et al. | |
| 2005/0167105 A1 * | 8/2005 | Roddy et al. | 166/293 |
| 2006/0075932 A1 | 4/2006 | Lecolier | |
| 2006/0086503 A1 | 4/2006 | Reddy et al. | |
| 2006/0162926 A1 | 7/2006 | Roddy | |
| 2006/0166834 A1 | 7/2006 | Roddy | |
| 2006/0177661 A1 | 8/2006 | Smith et al. | |
| 2006/0217463 A1 | 9/2006 | Lecolier | |
| 2006/0254466 A1 | 11/2006 | Drochon | |
| 2006/0260513 A1 | 11/2006 | Porro Guiterrez et al. | |
| 2006/0289163 A1 | 12/2006 | Lecolier | |
| 2007/0015668 A1 | 1/2007 | Harrower et al. | |
| 2007/0056732 A1 | 3/2007 | Roddy et al. | |
| 2008/0058229 A1 | 3/2008 | Berkland et al. | |
| 2008/0242769 A1 | 10/2008 | Birgisson et al. | |
| 2008/0277116 A1 | 11/2008 | Roddy et al. | |
| 2009/0032252 A1 | 2/2009 | Boney et al. | |
| 2009/0054269 A1 | 2/2009 | Chatterji et al. | |
| 2009/0124522 A1 | 5/2009 | Roddy et al. | |
| 2009/0137431 A1 | 5/2009 | Reddy et al. | |
| 2009/0139719 A1 | 6/2009 | Luo et al. | |
| 2009/0200029 A1 | 8/2009 | Roddy et al. | |
| 2009/0236097 A1 | 9/2009 | Roddy et al. | |
| 2009/0260544 A1 | 10/2009 | Roddy et al. | |
| 2010/0016183 A1 | 1/2010 | Roddy et al. | |
| 2010/0025039 A1 | 2/2010 | Roddy et al. | |
| 2010/0075874 A1 | 3/2010 | Mercado et al. | |
| 2010/0095871 A1 | 4/2010 | Patil et al. | |
| 2010/0096135 A1 | 4/2010 | Roddy et al. | |

FOREIGN PATENT DOCUMENTS

| | | |
|---|---|---|
| WO | WO 0050357 A1 | 8/2000 |
| WO | WO 0187796 A1 | 11/2001 |

OTHER PUBLICATIONS

"Application of nanometer silica in inorganic nonmetallic materials," Deng et al., Taoci (Xiangyang China) 2007, (9), 8-12, abstract only.

"Reaction mechanism analyses of cement based composite materials modified by nano-silica," Xu et al., Kuangye Gongcheng (Changsha, China), 2007, 27(3), 99-102, abstract only.

"Research on Reinforcement of cement composites and relevant mechanism," Yu et al., Qiangdoa Keji Daxue Xuebao, Ziran Kexueban (2006), 27(2), 148-151, abstract only.

"Antagonistic Effect of superplasticizer and colloidal nanosilica in the hydration of Alite and Belite pastes," Bjoernstrom et al., Journal of Materials Science, 2007, 42(11), 3901-3907, abstract only.

"Nano-concrete: possibilities and challenges," Balaguru et al., RILEM Proceedings (2005), PRO 45 (2nd Int'l Symposium on Nanotechnology in construction (NICOM2), 2005, 233-243, abstract only.

"A comparative study on the pozzolanic activity between nano-SiO2 and silica fume," Ye et al., Journal of Wuhan Univ of Technology, Mat'ls Science Edition (2006), 21(3), 153-157, abstract only.

"Optimization of silica fume, fly ash and amorphous nano-silica in superplasticized high-performance concrete," Collepardi et al., American Concrete Institute, SP 2004, SP-221 (Eight CANMET/ACI International Conference on Fly Ash, Silica Fume, Slag, and Natrural Pozzolans in Concrete, 2004), 495-505, abstract only.

"Accelerating effects of colloidal nano-silica for beneficial calcium-silicate-hydrate formation in cement," Bjornstrom et al., Chemical Physics Letters (2004), 392 (1-3), 242-248, abstract only.

"Experimental study on cement-based composites with nano-SiO2," Feng et al., Cailiao Kexue Yu Gongcheng Zuebao Bianjibu (2004), 22(2), 224-227.

"Strong and bioactive composites containing nano-silica-fused whiskers for bone repair," Xu et al., Biomaterials (2004), 25(19), 4615-4626, abstract only.

Research on properties of Portland cement added with nano-SiO2, Wang et al., RILEM Proceedings (2003), PRO 32 (International Conference on Advances in Concrete and Structures, 2003, vol. 1), 154-161, abstract only.

"Comparison on properties of high strength concrete with nano-SiO2 and silica fume added," Ye et al., Jianzhu Cailiao Xuebao (2003), 6(4), 381-385, abstract only.

"Study on compound effect of silica fume and nano-SiOx for cementing composite materials," Tang et al., Guisuanyan Xuebao (2003), 3(5), 523-527, abstract only.

"Effect of nano-SiOx and silica fume on cement paste water demand," Li et al., Shenyang Jianzhu gongcheng Xueyuan Xuebao, Ziran Kexueban (2002), 18(4), 278-281, abstract only.

"Hydration reaction between C3S and fly ash, silica fume, nano-SiO2, and microstructure of hydrated pastes," Ba et al., Guisuanyan Xuebao (2002), 30(6), 780-784, abstract only.

"Nano-silica—an additive for high-strength concrete," Wagner et al., Wissenschaftliche Zeitschrift—Hoschule fuer Architektur und Bauwesen Weimar—Universitaet (1994), 40 (5/6/7), 183-87, abstract only.

"Investigations on the preparation and mechanical properties of the nano-alumina reinforced cement composite," Li et al., Materials Letters (2006), 0(3), 356-359, abstract only.

"Effect of secondary interface microstructure on pore structure and performance of cement-based materials," Feng et al., Cailiao Yanjiu Xuebao (2003), 17(5), 489-494, abstract only.

"Preparation of multifunctional dry-power paints," Yanmin Gao, Faming Zhuanli Shenqing gongkai Shuomingshu, 4 pages, 2005, abstract only.

U.S. Appl. No. 12/426,393, filed Apr. 20, 2009, Roddy.
U.S. Appl. No. 12/426,645, filed Apr. 20, 2009, Roddy.
U.S. Appl. No. 12/472,561, filed May 27, 2009, Roddy.

Jerzy Chrusciel and Ludomir Slusarski, Synthesis of Nanosilica by the Sol-Gel Method and its Activity Toward Polymers, Materials Science, vol. 21, Nov. 4, 2003,pp. 461-469.

Konstantin Sobolev, NSF Workshop on Nanomodification of Cementitious Materials: Portland Cement Concrete and Asphalt Concrete, "Nanomodification of Cement", Aug. 2006.

Cardenas and Struble, Electrokinetic Nanoparticle Treatment of Hardened Cement Paste for Reduction of Permeability, Journal of Materials in Civil Eng. @ASCE, Aug. 2006, pp. 554-560.

Konstantin Sobelev and Miguel Ferrada-Gutierrez, Nanotechnology of Concrete (printed from Internet Feb. 20, 2007).

T. Sato and J. J. Beaudoin, "The Effect of Nano-Sized CaCO3 Addition on the Hydration of OPC Containing High volumes of Ground Granulated Blast-Furnace Slag", NRCC-46654,Sep. 2006.

Halliburton Fluid Systems BARACARB Bridging Agent, Product Data Sheet, Sep. 2006.

Halliburton Fluid Systems, Cementing, CFR-3 Cement Friction Reducer, Dispersant, H01325, Oct. 2005.

Halliburton Fluid Systems, Cementing, D-Air 3000 and D-Air 3000L, Defoamers H02518-A4, Jun. 2007.

Halliburton ementing HR-6L, Cement Retarder, H01474, Aug. 2007.

Halliburton, Cementing, Stabilizer 434B, Latex Stabilizer, H01519, Aug. 2007.

Halliburton Fluid Systems, Cementing, Stabilizer 434C, Latex Stabilizer, H01341, Oct. 2005.

Halliburton Fluid Systems, Cementing, Latex 2000, Cement Additive, H01336-A4, Aug. 2006.

* cited by examiner

| US 8,157,009 B2 |

CEMENT COMPOSITIONS AND ASSOCIATED METHODS COMPRISING SUB-MICRON CALCIUM CARBONATE AND LATEX

BACKGROUND

The present invention relates to cementing operations. More particularly, in certain embodiments, the present invention includes cement compositions and methods of cementing in a subterranean formation that comprise cement, sub-micron calcium carbonate, latex, and water.

In general, well treatments include a wide variety of methods that may be performed in oil, gas, geothermal and/or water wells, such as drilling, completion and workover methods. The drilling, completion and workover methods may include, but are not limited to, drilling, fracturing, acidizing, logging, cementing, gravel packing, perforating and conformance methods. Many of these well treatments are designed to enhance and/or facilitate the recovery of desirable fluids from a subterranean well.

In cementing methods, such as well construction and remedial cementing, well cement compositions are commonly utilized. For example, in subterranean well construction, a pipe string (e.g., casing and liners) may be run into a well bore and cemented in place using a cement composition. The process of cementing the pipe string in place is commonly referred to as "primary cementing." In a typical primary cementing method, a cement composition may be pumped into an annulus between the walls of the well bore and the exterior surface of the pipe string disposed therein. The cement composition sets in the annular space, thereby forming an annular sheath of hardened, substantially impermeable cement that supports and positions the pipe string in the well bore and bonds the exterior surface of the pipe string to the subterranean formation. Among other things, the annular sheath of set cement surrounding the pipe string functions to prevent the migration of fluids in the annulus, as well as protecting the pipe string from corrosion. Cement compositions also may be used in remedial cementing methods, such as squeeze cementing and the placement of cement plugs.

In operation, the annular sheath of cement formed between the well bore and the pipe string often suffers structural failure due to pipe movements which cause shear stresses to be exerted on the set cement. Such stress conditions are commonly the result of relatively high fluid pressures and/or temperatures inside the cemented pipe string during testing, perforating, fluid injection or fluid production. For example, such stress may occur in wells subjected to steam recovery or production of hot formation fluids from high-temperature formations. The high-internal pipe pressure and/or temperature can result in the expansion of the pipe string, both radially and longitudinally, which places stresses on the cement sheath causing the cement bond between the exterior surfaces of the pipe or the well bore walls, or both, to fail and thus allow leakage of formation fluids and so forth. Accordingly, it may be desirable for the cement composition utilized for cementing pipe strings in the well bores to develop high strength after setting and to have sufficient resiliency (e.g., elasticity and ductility) to resist loss of the cement bond between the exterior surfaces of the pipe or the well bore walls, or both. Also, it may be desirable for the cement composition to be able to resist cracking and/or shattering that may result from other forces on the cement sheath. For example, it may be desirable for the cement sheath to include structural characteristics that protect its structural integrity from forces associated with formation shifting, overburden pressure, subsidence, tectonic creep, pipe movements, impacts and shocks subsequently generated by drilling and other well operations.

Heretofore, latex has been included in cement compositions for use in subterranean formations to improve various properties of the compositions. For example, latex may be included in a cement composition for fluid loss control, to provide resiliency to the set cement, and/or to reduce the issues associated with gas channeling. In general, latex used in cement compositions is often provided as a water-in-oil emulsion containing high quantities of natural or synthetic rubber (such as styrene-butadiene rubber). However, latex-containing cement compositions typically may have reduced strength with respect to comparable cement compositions. In addition, latex-containing cement compositions typically may slower strength development as well.

SUMMARY

The present invention relates to cementing operations. More particularly, in certain embodiments, the present invention includes cement compositions and methods of cementing in a subterranean formation that comprise cement, sub-micron calcium carbonate, latex, and water.

An embodiment of the present invention provides a method of cementing in a subterranean formation. The method may comprise introducing a cement composition into the subterranean formation, wherein the cement composition comprises cement, water, sub-micron calcium carbonate, and latex. The method further may comprise allowing the cement composition to set in the subterranean formation.

Another embodiment of the present invention provides a method of cementing in a subterranean formation. The method may comprise introducing a cement composition into a space between the subterranean formation and a conduit disposed in the subterranean formation. The cement composition may comprise cement, water, sub-micron calcium carbonate, and latex, wherein the sub-micron calcium carbonate has a particle size in the range of about 200 nm to about 800 nm and is present in an amount of at least about 0.1 gallons per 94-pound sack of the cement. The method further may comprise allowing the cement composition to set in the space.

Yet another embodiment of the present invention may provide a cement composition that may comprise cement, water, a sub-micron calcium carbonate, and latex.

The features and advantages of the present invention will be readily apparent to those skilled in the art. While numerous changes may be made by those skilled in the art, such changes are within the spirit of the invention.

DESCRIPTION OF THE PREFERRED EMBODIMENTS

The present invention relates to cementing operations. More particularly, in certain embodiments, the present invention includes cement compositions and methods of cementing in a subterranean formation that comprise cement, sub-micron calcium carbonate, latex, and water.

There may be several potential advantages to the methods and compositions of the present invention, only some of which may be alluded to herein. One of the many advantages of the present invention is that inclusion of sub-micron calcium carbonate in latex-containing cement compositions may improve the mechanical properties of the cement composition. By way of example, inclusion of sub-micron calcium carbonate may provide improved strength development as well as increased compressive strength for latex-containing cement compositions. Another potential advantage of the present invention is that inclusion of sub-micron calcium carbonate in latex-containing cement compositions may provide improved fluid-loss properties for the latex-containing cement compositions.

An embodiment of the cement compositions of the present invention comprises cement, water, sub-micron calcium carbonate, and latex. Those of ordinary skill in the art will appreciate that the example cement compositions generally should have a density suitable for a particular application. By way of example, the cement composition may have a density in the range of about 4 pounds per gallon ("ppg") to about 20 ppg. In certain embodiments, the cement compositions may have a density in the range of about 8 ppg to about 17 ppg. Embodiments of the cement compositions may be foamed or unfoamed or may comprise other means to reduce their densities, such as hollow microspheres, low-density elastic beads, or other density-reducing additives known in the art. Those of ordinary skill in the art, with the benefit of this disclosure, will recognize the appropriate density for a particular application.

Embodiments of the cement compositions of the present invention comprise a cement. Any of a variety of cements suitable for use in subterranean cementing operations may be used in accordance with embodiments of the present invention. Suitable examples include hydraulic cements that comprise calcium, aluminum, silicon, oxygen and/or sulfur, which set and harden by reaction with water. Such hydraulic cements, include, but are not limited to, Portland cements, pozzolana cements, gypsum cements, high-alumina-content cements, slag cements, silica cements and combinations thereof. In certain embodiments, the hydraulic cement may comprise a Portland cement. The Portland cements that may be suited for use in embodiments of the present invention are classified as Class A, C, H and G cements according to according to American Petroleum Institute, *Recommended Practice for Testing Well Cements*, API Specification 10B-2 (ISO 10426-2), First edition, July 2005. In addition, in some embodiments, cements suitable for use in the present invention may include cements classified as ASTM Type I, II, or III.

The water used in embodiments of the cement compositions of the present invention may be freshwater or saltwater (e.g., water containing one or more salts dissolved therein, seawater, brines, saturated saltwater, etc.). In general, the water may be present in an amount sufficient to form a pumpable slurry. In certain embodiments, the water may be present in the cement compositions in an amount in the range of about 33% to about 200% bwoc. In certain embodiments, the water may be present in an amount in the range of about 35% to about 70% bwoc.

Embodiments of the cement compositions of the present invention further comprise sub-micron calcium carbonate. In certain embodiments, the sub-micron calcium carbonate may be provided as a colloidal suspension in a base fluid. In other embodiments, the sub-micron calcium carbonate may be provided in a dry form. As used in this disclosure, sub-micron calcium carbonate is defined as calcium carbonate having a particle size of less than 1 micron. For example, the sub-micron calcium carbonate may have a particle size in the range of about 100 nanometers ("nm") to about 1 micron. In certain embodiments, the sub-micron calcium carbonate may have a particle size in the range of about 200 nm to about 800 nm. However, it should be noted that the sub-micron calcium carbonate may be used in combination with differently sized particles of calcium carbonate, in accordance with present embodiments. For example, calcium carbonate with particle sizes greater than 1 micron may be included in a cement composition in accordance with present embodiments.

As used herein, "particle size" refers to volume surface mean diameter ("$D_S$") which is related to the specific surface area. Volume surface mean diameter may be defined by the following formula: $D_S=6/(\Phi_S A_w \rho_p)$ where $\Phi_S$=sphericity; $A_w$=Specific surface area and $\rho_p$=Particle density. It should be understood that the particle size of the sub-micron particle may vary based on the measurement technique, sample preparation, and sample conditions (e.g., temperature, concentration, etc.). One technique for measuring particle size of the sub-micron particles at room temperature (approx. 80° F.) includes dispersing the particle in a suitable solvent (such as chloroform, dichloroethane, acetone, methanol, ethanol, water, etc.) by sonification and proper dilution. A dispersing agent may be used to deagglomerate the particles, if needed. The diluted, dispersed solution may then be placed on a carbon-coated copper grid with 300 mesh size by using a micropipette. It may then be dried and examined by Transmission electron microscopy (TEM). The particle size distribution may be obtained with high accuracy using an appropriate computation technique. By way of example, TEM image processing may use image-processing software such as Image-Pro® Plus software from Media Cybernetics to determine the particle size. Another example technique involves use of calibrated drawing tools in Digital Micrograph software followed by statistical analysis of the data with Kaleida-Graph software to determine the particle size.

It is now recognized that the sub-micron calcium carbonate utilized with present embodiments, may have an impact on certain physical characteristics of the latex-containing cement compositions. For example, relative to latex-containing cement compositions that do not contain sub-micron calcium carbonate, inclusion of sub-micron calcium carbonate may provide for more rapid strength development as well as increased compressive strength. More particularly, inclusion of sub-micron calcium carbonate having a particle size in the range of about 200 nm to about 800 nm in an amount of at least about 0.2 gallons per 94-pound sack of cement ("gps") may provide for at least 25% more rapid development of 500 psi and potentially at least 50% more rapid development of 500 psi. In addition, inclusion of sub-micron calcium carbonate having a particle size in the range of about 200 nm to about 800 nm in an amount of at least about 0.2 gps may provide for at least about a 60% increase in 24-hour compressive strength and potentially at least a 70% increase in 24-hour compressive strength.

In addition, inclusion of sub-micron calcium carbonate may provide for improved fluid-loss properties with respect to compositions that do not contain sub-micron calcium carbonate. By way of example, inclusion of sub-micron calcium carbonate having a particle size in the range of about 200 nm to about 800 nm in an amount of at least about 0.2 gps may provide for at least about a 40% improvement in API fluid loss and potentially at least a 50% improvement in API fluid loss.

Accordingly, a cement composition in accordance with present embodiments may comprise a sufficient amount of the sub-micron calcium carbonate to provide the desired characteristics in a resulting cement. In some embodiments, the sub-micron calcium carbonate may be present in the cement composition in an amount in the range of about 0.1% to about 10% by weight of the cement on a dry basis ("bwoc"). In certain embodiments, the sub-micron calcium carbonate may be present in the cement composition in an amount in the range of about 0.5% to about 5% bwoc.

Moreover, embodiments of the cement compositions of the present invention also may comprise a latex. As will be understood by those skilled in the art, the latex may comprise any of a variety of rubber materials that are commercially available in latex form. Suitable rubber materials include natural rubber (e.g., cis-1,4-polyisoprene), modified natural rubber, synthetic rubber, and combinations thereof. Synthetic rubber of various types may be utilized, including ethylene-propylene rubbers, styrene-butadiene rubbers, nitrile rubbers, nitrile butadiene rubbers, butyl rubber, neoprene rubber, polybutadiene rubbers, acrylonitrile-styrene-butadiene rubber, polyisoprene rubber, and AMPS-styrene-butadiene rubber, combinations thereof. As used herein, the term "AMPS" refers to 2-acrylamido-2-methylpropanesulfonic acid or salts thereof. In certain embodiments, the synthetic rubber may comprise AMPS in an amount ranging from about 7.5% to about 10%, styrene in an amount ranging from about 30% to about 70% and butadiene in an amount ranging from about 30% to about 70%. Examples of suitable AMPS-styrene-butadiene rubbers are described in more detail in U.S. Pat. Nos. 6,488,764 and 6,184,287, the entire disclosures of which are incorporated herein by reference. Those of ordinary skill in the art will appreciate that other types of synthetic rubbers are also encompassed within the present invention.

In certain embodiments, the latex comprises a water-in-oil emulsion that comprises styrene-butadiene rubber. As will be appreciated, the aqueous phase of the emulsion comprises an aqueous colloidal dispersion of the styrene-butadiene copolymer. Moreover, in addition to the dispersed styrene-butadiene copolymer, the emulsion may comprise water in the range of about 40% to about 70% by weight of the emulsion and small quantities of an emulsifier, polymerization catalysts, chain modifying agents, and the like. As will be appreciated, styrene-butadiene latex is often produced as a terpolymer emulsion that may include a third monomer to assist in stabilizing the emulsion. Non-ionic groups which exhibit stearic effects and which contain long ethoxylate or hydrocarbon tails may also be present.

In accordance with embodiments of the present invention, the weight ratio of the styrene to the butadiene in the latex may be in the range of about 10:90 to about 90:10. In some embodiments, the weight ratio of the styrene to the butadiene in the emulsion may be in the range of about 20:80 to about 80:20. An example of a suitable styrene-butadiene latex has a styrene-to-butadiene weight ratio of about 25:75 and comprises water in an amount of about 50% by weight of the emulsion. Such a styrene-butadiene latex is available from Halliburton Energy Services, Duncan, Okla., under the name Latex 2000™ cement additive. Another example of a suitable styrene-butadiene latex has a styrene-to-butadiene weight ratio of about 30:70.

The latex may generally be provided in the cement compositions of the present invention in an amount sufficient for the desired application. In some embodiments, the latex may be included in the cement compositions in an amount in the range of about 2% to about 45% bwoc. In some embodiments, the latex may be included in the cement compositions in an amount in the range of about 5% to about 27% bwoc.

Embodiments of the cement compositions of the present invention also may comprise a latex stabilizer. Among other things, the latex stabilizer may be included in embodiments of the cement compositions for preventing the cement compositions from prematurely coagulating. Suitable latex stabilizers may include a surfactant or combination of surfactants for preventing the premature inversion of the latex emulsion. Examples of suitable latex stabilizers include, but are not limited to, sulfonates and sulfates. Additional examples of suitable latex stabilizing surfactants which are suitable for this purpose may have the formula R-Ph-O(OCH$_2$CH$_2$)$_m$OH where R contains an alkyl group of from about 5 to about 30 carbon atoms, Ph contains a phenyl group, and m is an integer having value between 5 to 50. An example of a surfactant of this formula is ethoxylated nonylphenyl containing in the range of about 20 to about 30 moles of ethylene oxide. Another example of a suitable surfactant is a salt having the formula R$_1$(R$_2$O)$_n$SO$_3$X where R$_1$ contains an alkyl group having 5 to 20 carbon atoms, R$_2$ contains the group —CH$_2$—CH$_2$—, n is an integer having value in between 10 to 40, and X is any suitable cation. An example of surfactant of this formula is the sodium salt of a sulfonated compound derived by reacting a C$_{12-15}$ alcohol with about 15 moles of ethylene oxide having the formula H(CH$_2$)$_{12-15}$(CH$_2$CH$_2$O)$_{15}$SO$_3$Na. Specific examples of suitable latex stabilizers include Stabilizer 434B™ latex stabilizer, Stabilizer 434C™ latex stabilizer, and Stabilizer 434D™ latex stabilizer, which are available from Halliburton Energy Services, Inc. While embodiments of the present invention encompass a wide variety of different latex stabilizers and amounts thereof that may be included in the cement compositions of the present invention depending on the particular latex used and other factors, the latex stabilizer may be included in embodiments of the cement compositions in an amount in the range of about 0% to about 30% by weight of the aqueous latex in the cement composition and, alternatively, about 10% to about 20% by weight.

Other additives suitable for use in subterranean cementing operations also may be added to embodiments of the cement compositions, in accordance with embodiments of the present invention. Examples of such additives include, but are not limited to, strength-retrogression additives, set accelerators, set retarders, weighting agents, lightweight additives, gas-generating additives, mechanical property enhancing additives, lost-circulation materials, filtration-control additives, dispersants, a fluid loss control additive, defoaming agents, foaming agents, thixotropic additives, and combinations thereof. By way of example, the cement composition may be a foamed cement composition further comprising a foaming agent and a gas. Specific examples of these, and other, additives include crystalline silica, amorphous silica, fumed silica, salts, fibers, hydratable clays, calcined shale, vitrified shale, microspheres, fly ash, slag, diatomaceous earth, metakaolin, rice husk ash, natural pozzolan, zeolite, cement kiln dust, lime, elastomers, resins, latex, combinations thereof, and the like. A person having ordinary skill in the art, with the benefit of this disclosure, will readily be able to determine the type and amount of additive useful for a particular application and desired result.

An example of a cement composition of the present invention comprises Portland cement, sub-micron calcium carbonate in an amount of about 0.8% to about 3% bwoc, latex in an amount of about 11% bwoc and comprising styrene-butadiene rubber, and water. By way of further example, the aqueous latex may contain AMPS-styrene-butadiene rubber rather than the styrene-butadiene rubber. Additional additives may include a defoaming agent (such as D-AIR 3000L™ defoamer), a latex stabilizer (such as Stabilizer 434B™ latex stabilizer), a cement set retarder (such as HR-6L retarder), and a cement dispersant (such as CFR-3L dispersant).

Another example of a cement composition of the present invention comprises Portland cement, sub-micron calcium carbonate in an amount of about 2.5% bwoc, latex in an amount of about 5.5% to about 16% bwoc and comprising styrene-butadiene rubber, and water. By way of further example, the aqueous latex may contain AMPS-styrene-butadiene rubber rather than the styrene-butadiene rubber. Additional additives may include a defoaming agent (such as D-AIR 3000L™ defoamer), a latex stabilizer (such as Stabilizer 434B™ latex stabilizer), a cement set retarder (such as HR-6L retarder), and a cement dispersant (such as CFR-3L dispersant).

As will be appreciated by those of ordinary skill in the art, embodiments of the cement compositions of the present invention may be used in a variety of subterranean applications, including primary and remedial cementing. Embodiments of the cement compositions may be introduced into a subterranean formation and allowed to set therein. Embodiments of the cement compositions may comprise cement, sub-micron calcium carbonate, latex, and water. By way of example, in example primary cementing embodiments, a cement composition may be introduced into a space between a subterranean formation and a pipe string located in the subterranean formation. The cement composition may be allowed to set to form a hardened mass in the space between the subterranean formation and the pipe string. In addition, in example remedial cementing embodiments, a cement composition may be used, for example, in squeeze-cementing operations or in the placement of cement plugs. One or more hydrocarbons (e.g., oil, gas, etc.) may be produced from a well bore penetrating the subterranean formation.

To facilitate a better understanding of the present technique, the following examples of some specific embodiments are given. In no way should the following examples be read to limit, or to define, the scope of the invention.

EXAMPLE 1

This example was performed to analyze the effect of including sub-micron calcium carbonate in latex-containing cement compositions. For this example, six different slurries were prepared. The slurries and resulting set cements were then tested to determine their mechanical properties, fluid-loss properties and rheological properties. As set forth below, the respective test results for the six different slurries demonstrate that inclusion of sub-micron calcium carbonate in the slurry provides higher early strength development, increases compressive strength, and provides better fluid loss control without significant impact on the rheological properties.

Slurries 1-6 were prepared by adding the sub-micron calcium carbonate to the water along with the other liquid additives. After combination with the liquid additives, the water was then combined with the cement to form the respective slurry. Each of slurries contained Portland Class H cement, latex in an amount of 1 gps and sub-micron calcium carbonate in an amount ranging from 0 gps to 0.35 gps. Additional additives present in each slurry were D-AIR 3000L™ defoamer in an amount of 0.05 gps, Stabilizer 434B™ latex stabilizer in an amount of 0.2 gps, HR®-6L cement set retarder in an amount of 0.05 gps, and CFR-3L™ dispersant in an amount of 0.143 gps. Sufficient water was included in the slurries to provide a density of 16.4 ppg. The latex included in the slurries was Latex 2000™ cement additive having a particle size ranging from 150 nm to 200 nm. The sub-micron calcium carbonate was supplied by Revertex-KA Latex (India) Private Limited and had a particle size of 200 nm to 800 nm. Eight-five percent by weight of the calcium carbonate had a particle size of less than 1 micron.

After the six slurries were prepared, tests were performed to determine various physical characteristics associated with inclusion of the sub-micron calcium carbonate in each of the associated cement compositions. One of these tests was performed to determine force resistance properties for each of the slurries. An ultrasonic cement analyzer ("UCA") available from FANN Instrument Company, UCA autoclave (controller model 304) was used to determine the compressive strength of the cement composition after twenty-four hours. Additionally, the UCA was also used to determine the time for the cement composition to develop a compressive strength of 500 psi. The UCA tests were performed in accordance with API Recommended Practice 10B-2 (ISO 10426-2), First edition, July, 2005, "Recommended Practice for Testing Well Cements."

The results of these tests are provided in the table below.

TABLE 1

Effect of Sub-Micron $CaCO_3$ Loading on Development of High-Early Strength and 24-Hour Compressive Strength in Latex-Containing Slurries

| Slurry | Amount of Latex (gps) | Amount of Sub-Micron $CaCO_3$ (gps) | UCA Time for 500 psi (hr:min) | UCA Strength at 24 hrs (psi) |
|---|---|---|---|---|
| 1 | 1 | 0 | 19:52 | 1417 |
| 2 | 1 | 0.1 | 16:17 | 1883 |
| 3 | 1 | 0.2 | 10:57 | 2572 |
| 4 | 1 | 0.3 | 13:17 | 2535 |
| 5 | 1 | 0.325 | 13:22 | 2415 |
| 6 | 1 | 0.35 | 15:08 | 2471 |

Accordingly, Table 1 illustrates the development of high-early strength and 24-hour compressive strength as the concentration of sub-micron calcium carbonate is increased from 0 gps to 0.2 gps. In particular, as compared to slurries without sub-micron calcium carbonate, the compressive strength obtained in 24 hours for the slurry containing sub-micron calcium carbonate in an amount of 0.2 gps or greater increased over 80%. Moreover, the time required for the development of 500 psi is considerably more rapid (almost half) as compared to the slurry with no calcium carbonate.

Additional tests were performed on Slurries 1-6 to determine rheology and fluid-loss properties for each of the slurries. Each of the slurries was poured into a pre-heated cell with a 325-mesh screen, and a fluid-loss test was performed for 30 minutes at 1,000 psi and 190° F., in accordance with API Recommended Practice 10B-2 (ISO 10426-2). Additionally, the rheological properties of the slurries were also determined using a Fann Model 35 viscometer at 190° F. using a bob and sleeve and spring #1. The plastic viscosity and the yield points of the slurries were calculated from Best Rheology using the Generalized Hershel Bulkley Model.

The results of these tests are provided in the table below.

TABLE 2

Effect of Sub-Micron CaCO₃ on Rheology and
Fluid Loss on Latex-Containing Slurries

| Slurry | Amount of Latex (gps) | Amount of Sub-Micron CaCO₃ (gps) | Rotational Viscometer (Bob & Sleeve; Spring #1) | | | | | | | 190° F. API Fluid Loss (ml/30 min) |
|---|---|---|---|---|---|---|---|---|---|---|
| | | | 300 | 200 | 100 | 6 | 3 | PV | YP | |
| 1 | 1 | 0 | 34 | 23 | 13 | 3 | 2 | 31.01 | 2.02 | 84 |
| 2 | 1 | 0.1 | 25 | 20 | 12 | 4 | 3 | 14.16 | 2.62 | 74 |
| 3 | 1 | 0.2 | 24 | 18 | 11 | 4 | 3 | 13.29 | 2.62 | 46 |
| 4 | 1 | 0.3 | 30 | 23 | 14 | 4 | 3 | 19.35 | 2.55 | 34 |
| 5 | 1 | 0.325 | 32 | 20 | 14 | 3 | 2 | 25.20 | 1.77 | 70 |
| 6 | 1 | 0.35 | 39 | 29 | 17 | 5 | 4 | 30.53 | 3.74 | 88 |

Accordingly, Table 2 illustrates that the API fluid loss of the latex-containing slurries was substantially reduced when 0.3 gps of sub-micron calcium carbonate was employed in a slurry containing 1 gps of latex. Moreover, Table 2 illustrates that inclusion of the sub-micron calcium carbonate in the latex-containing slurries did not significantly affect the rheological properties.

EXAMPLE 2

This example was performed to analyze the effect of latex concentration on the compressive strength of slurries containing sub-micron calcium carbonate. For this example, eight different slurries were prepared. The slurries and resulting set cements were then tested to determine their mechanical properties, fluid-loss properties and rheological properties. As set forth below, the respective test results for the eight different slurries demonstrate that improved properties from inclusion of sub-micron calcium carbonate hold for differing amounts of latex.

Slurries 7-14 were prepared by adding the sub-micron calcium carbonate to the water along with the other liquid additives. After combination with the liquid additives, the water was then combined with the cement to form the respective slurry. Each of slurries contained Portland Class H cement, latex in an amount ranging from 0.5 gps to 1.5 gps, and sub-micron calcium carbonate in an amount of either 0 gps or 0.3 gps. Additional additives present in each slurry were D-AIR 3000L™ defoamer in an amount of 0.05 gps, Stabilizer 434B™ latex stabilizer in an amount of 0.2 gps, HR®-6L cement set retarder in an amount of 0.05 gps, and CFR-3L™ dispersant in an amount of 0.143 gps. Sufficient water was included in the slurries to provide a density of 16.4 ppg. The latex included in the slurries was Latex 2000™ cement additive having a particle size ranging from 150 nm to 200 nm. The sub-micron calcium carbonate was supplied by Revertex-KA Latex (India) Private Limited and had a particle size of 200 nm to 800 nm. Eight-five percent by weight of the calcium carbonate had a particle size of less than 1 micron.

After the eight slurries were prepared, tests were performed to determine various physical characteristics associated with varying the amount of latex on slurries containing sub-micron calcium carbonate. One of these tests was performed to determine force resistance properties for each of the slurries. The UCA was used to determine the compressive strength of the cement composition after twenty-four hours. Additionally, the UCA was also used to determine the time for the cement composition to develop a compressive strength of 500 psi. The UCA tests were performed in accordance with API Recommended Practice 10B-2 (ISO 10426-2).

The results of these tests are provided in the table below.

TABLE 3

Effect of Latex Concentration on Compressive Strength of
Slurries Containing Sub-Micron CaCO₃

| Slurry | Amount of Latex (gps) | Amount of Sub-Micron CaCO₃ (gps) | UCA Time for 500 psi (hr:min) | Strength at 24 hrs (psi) |
|---|---|---|---|---|
| 7 | 0.5 | 0.3 | 11:43 | 3093 |
| 8 | 0.5 | 0 | 16:51 | 2551 |
| 9 | 0.75 | 0.3 | 12:52 | 3103 |
| 10 | 0.75 | 0 | 16:13 | 2426 |
| 11 | 1 | 0.3 | 13:17 | 2535 |
| 12 | 1 | 0 | 19:52 | 1417 |
| 13 | 1.5 | 0.3 | 17:09 | 1832 |
| 14 | 1.5 | 0 | 23:05 | 690 |

Accordingly, Table 3 illustrates that the effect of sub-micron calcium carbonate on the slurries holds for varying amounts of latex, in that it generally gives more rapid strength development and 24-hour compressive strength irrespective of latex concentration compared to slurries without calcium carbonate.

Additional tests were performed on Slurries 7-14 to determine rheology and fluid-loss properties for each of the slurries. Each of the slurries was poured into a pre-heated cell with a 325-mesh screen, and a fluid-loss test was performed for 30 minutes at 1,000 psi and 190° F., in accordance with API Recommended Practice 10B (ISO-10426-2). Additionally, the rheological properties of the slurries were also determined using a Fann Model 35 viscometer at 190° F. using a bob and sleeve and spring #1. The plastic viscosity and the yield points of the slurries were calculated from Best Rheology using the Generalized Hershel Bulkley Model.

The results of these tests are provided in the table below.

TABLE 4

Effect of Latex Concentration on Fluid Loss and Rheology of Slurries Containing Sub-Micron CaCO$_3$

| Slurry | Amount of Latex (gps) | Amount of Sub-Micron CaCO$_3$ (gps) | Rotational Viscometer (Bob & Sleeve; Spring #1) | | | | | | | 190° F. API Fluid Loss (ml/30 min) |
|---|---|---|---|---|---|---|---|---|---|---|
| | | | 300 | 200 | 100 | 6 | 3 | PV | YP | |
| 7 | 0.5 | 0.3 | 24 | 16 | 10 | 3 | 2 | 20.46 | 2.19 | 100 |
| 8 | 0.5 | 0 | 35 | 22 | 11 | 3 | 2 | 32.38 | 1.50 | 150 |
| 9 | 0.75 | 0.3 | 23 | 15 | 9 | 2 | 1 | 20.46 | 1.09 | 54 |
| 10 | 0.75 | 0 | 36 | 25 | 13 | 3 | 2 | 34.06 | 2.05 | 90 |
| 11 | 1 | 0.3 | 30 | 23 | 14 | 4 | 3 | 19.35 | 2.55 | 34 |
| 12 | 1 | 0 | 34 | 23 | 13 | 3 | 2 | 31.01 | 2.02 | 84 |
| 13 | 1.5 | 0.3 | 40 | 29 | 18 | 4 | 3 | 22.51 | 1.39 | 42 |
| 14 | 1.5 | 0 | 51 | 37 | 22 | 5 | 4 | 37.86 | 2.63 | 52 |

Accordingly, Table 4 illustrates that the slurries containing sub-micron calcium carbonate continue to exhibit improved fluid-loss results irrespective of the latex concentration compared to slurries without calcium carbonate.

EXAMPLE 3

This example was performed to analyze the influence of set retarders on slurries containing latex and sub-micron calcium carbonate. For this example, six different slurries were prepared. The slurries and resulting set cements were then tested to determine their thickening times and rate of strength development. As set forth below, the respective test results for the six different slurries demonstrate that slurries containing latex and sub-micron calcium carbonate are sensitive to retarder concentration.

Slurries 15-20 were prepared by adding the sub-micron calcium carbonate and set retarder to the water along with the other liquid additives. After combination with the liquid additives, the water was then combined with the cement to form the respective slurry. Each of slurries contained Portland Class H cement, latex in an amount of 1 gps, sub-micron calcium carbonate in an amount of either 0 gps or 0.3 gps, a set retarder in an amount ranging from 0.05 gps to 0.08 gps. Additional additives present in each slurry were D-AIR 3000L™ defoamer in an amount of 0.05 gps, Stabilizer 434B™ latex stabilizer in an amount of 0.2 gps, HR®-6L cement set retarder in an amount ranging from 0.05 gps to 0.08 gps, and CFR-3L™ dispersant in an amount of 0.143 gps. Sufficient water was included in the slurries to provide a density of 16.4 ppg. The latex included in the slurries was Latex 2000™ cement additive having a particle size ranging from 150 nm to 200 nm. The sub-micron calcium carbonate was supplied by Revertex-KA Latex (India) Private Limited and had a particle size of 200 nm to 800 nm. Eight-five percent by weight of the calcium carbonate had a particle size of less than 1 micron. The set retarder used in the slurries was HR-6L retarder, available from Halliburton Energy Services, Inc.

After the six slurries were prepared, tests were performed to determine various physical characteristics associated with varying the amount of set retarder in slurries containing latex and sub-micron calcium carbonate. One of these tests was performed to determine a thickening time associated with each of the six slurries. Specifically, the total thickening time for each slurry was determined by performing a thickening-time test in accordance with API Recommended Practice 10B-2 (ISO 10426-2). The measurement of thickening time for each slurry was based on the respective slurry reaching a consistency of 100 Bearden units (Bc) at 1900° F. In addition, the rate of strength development for each slurry was also determined by a mathematical calculation/graphical method, wherein the slope of the linear portion from onset of strength (50 psi) to 75% of ultimate strength of compressive strength versus time graph was determined, directly giving the rate of strength development.

The results of these tests are provided in the table below.

TABLE 5

Influence of Retarder Concentration on Thickening Time of Slurries Containing Latex and Sub-Micron CaCO$_3$

| Slurry | Amount of Latex (gps) | Amount of CaCO$_3$ (gps) | Amount of Retarder (gps) | Rate of Strength Development (psi/hr) | Thickening Time (hr:min) |
|---|---|---|---|---|---|
| 15 | 1 | 0 | 0.05 | 252.2 | 5:13 |
| 16 | 1 | 0.3 | 0.05 | 467.2 | 3:40 |
| 17 | 1 | 0 | 0.065 | 187.2 | 6:38 |
| 18 | 1 | 0.3 | 0.065 | 333 | 5:27 |
| 19 | 1 | 0 | 0.08 | 86.85 | 7:42 |
| 20 | 1 | 0.3 | 0.08 | 121.1 | 5:52 |

Accordingly, Table 5 illustrates that the slurries containing latex and sub-micron calcium carbonate are sensitive to set retarder concentrations, allowing potential adjustment of pump times by varying retarder concentration.

EXAMPLE 4

This example was performed to analyze the influence of calcium carbonate particle size on properties of latex-containing slurries. For this example, three different slurries were prepared. The slurries were then tested to determine their mechanical and fluid-loss properties. As set forth below, the respective test results for the three different slurries demonstrate that particle size of the calcium carbonate plays a role in the properties of the latex-containing slurries.

Slurries 21-23 were prepared by adding the liquid additives to water, followed by combination of the water with the cement to form the respective slurry. Dry additives, if any, were dry blended with the cement prior to combination with the water. Each of slurries contained Portland Class H cement, latex in an amount of 1 gps, and calcium carbonate in an amount of 0.3 gps. Additional additives present in each slurry were D-AIR 3000L™ defoamer in an amount of 0.05 gps, Stabilizer 434B™ latex stabilizer in an amount of 0.2 gps, HR®-6L cement set retarder in an amount of 0.05 gps, and CFR-3L™ dispersant in an amount of 0.143 gps. Sufficient water was included in the slurries to provide a density of 16.4 ppg. The latex included in the slurries was Latex 2000™ cement additive having a particle size ranging from 150 nm to 200 nm. No calcium carbonate was included in slurry 21. The calcium carbonate included in slurry 22 was BARACARB® 5 bridging agent having a particle size of 5 microns, available from Halliburton Energy Services, Inc. The sub-micron calcium carbonate in slurry 23 was supplied by Revertex-KA Latex (India) Private Limited and had a particle size of 200 nm to 800 nm. Eight-five percent by weight of the calcium carbonate had a particle size of less than 1 micron.

After the three slurries were prepared, tests were performed to determine various physical characteristics associated with varying the particle size of the calcium carbonate. One of these tests was performed to determine force resistance properties for each of the slurries. The UCA was used to determine the compressive strength of the cement composition after twenty-four hours. Additionally, the UCA was also used to determine the time for the cement composition to develop a compressive strength of 500 psi. The UCA tests were performed in accordance with API Recommended Practice 10B. Furthermore, each of the slurries was poured into a pre-heated cell with a 325-mesh screen, and a fluid-loss test was performed for 30 minutes at 1,000 psi and 190° F., in accordance with API Recommended Practice 10B-2 (ISO 10426-2).

The results of these tests are provided in the table below.

TABLE 6

Influence of Calcium Carbonate Particle Size on Latex-Containing Slurries

| Slurry | Amount of Latex (gps) | CaCO$_3$ Particle Size | CaCO$_3$ Amount (gps or equiv.) | 190° F. API Fluid Loss (ml/ 30 min) | UCA Time for 500 psi (hr:min) | UCA Strength at 24 hrs (psi) |
|---|---|---|---|---|---|---|
| 21 | 1 | n/a | 0 | 84 | 19:52 | 1417 |
| 22 | 1 | micron | 0.3 | 76 | 16:19 | 1474 |
| 23 | 1 | sub-micron | 0.3 | 34 | 13:17 | 2535 |

Accordingly, Table 6 illustrates that the particle size of the calcium carbonate impacts properties of the latex-containing slurries. In particular, while the micro-sized calcium carbonate provided improved fluid loss and more rapid strength development than for slurries without calcium carbonate, this test indicates that further lowering the particle size of the calcium carbonate to less than one micron provides much better mechanical and fluid-loss properties.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of cementing in a subterranean formation:
   introducing a cement composition into the subterranean formation, wherein the cement composition comprises cement, water, sub-micron calcium carbonate having a particle size in the range of greater than 100 nm to about 1 micron, and latex; and
   allowing the cement composition to set in the subterranean formation.

2. The method of claim 1 wherein the cement comprises at least one hydraulic cement selected from the group consisting of a Portland cement, a pozzolana cement, a gypsum cement, a high-alumina-content cement, a slag cement, a silica cement, and combinations thereof.

3. The method of claim 1 wherein the sub-micron calcium carbonate comprises a colloidal suspension in a base fluid.

4. The method of claim 1 wherein the sub-micron calcium carbonate is provided in a dry form.

5. The method of claim 1 wherein the sub-micron calcium carbonate has a particle size in the range of about 200 nm to about 800 nm.

6. The method of claim 5 wherein the sub-micron calcium carbonate is present in the cement composition in an amount in the range of about 0.1% to about 10% by weight of the cement on a dry basis.

7. The method of claim 1 wherein the latex comprises at least one rubber material selected from the group consisting of natural rubber, modified natural rubber, synthetic rubber, and combinations thereof.

8. The method of claim 1 wherein the latex comprises at least one synthetic rubber material selected from the group an ethylene-propylene rubber, a styrene-butadiene rubber, a nitrile rubber, a nitrile butadiene rubber, a butyl rubber, a neoprene rubber, a polybutadiene rubber, an acrylonitrile-styrene-butadiene rubber, a polyisoprene rubber, and combinations thereof.

9. The method of claim 1 wherein the latex comprises a water-in-oil emulsion that comprises styrene-butadiene rubber.

10. The method of claim 1 wherein the cement composition further comprises at least one additive selected from the group consisting of a latex stabilizer, a strength-retrogression additive, a set accelerator, a set retarder, a weighting agent, a lightweight additive, a gas-generating additive, a mechanical property enhancing additive, a lost-circulation material, a filtration-control additive, a fluid loss control additive, a dispersant, a defoaming agent, a foaming agent, a thixotropic additive, and combinations thereof.

11. The method of claim 1 wherein the cement composition further comprises at least one additive selected from the group consisting of crystalline silica, amorphous silica, fumed silica, a salt, a fiber, a hydratable clay, calcined shale, vitrified shale, a microsphere, fly ash, slag, diatomaceous earth, metakaolin, rice husk ash, natural pozzolan, zeolite, cement kiln dust, lime, an elastomers, a resin, and combinations thereof.

12. The method of claim 1 wherein introducing the cement composition into the subterranean formation comprises introducing the cement composition into a space between a pipe string and a wall of a well bore that penetrates the subterranean formation.

13. The method of claim 1 further comprising introducing the pipe string into the well bore.

14. A method of cementing in a subterranean formation:
introducing a cement composition into a space between the subterranean formation and a conduit disposed in the subterranean formation, wherein the cement composition comprises cement, water, sub-micron calcium carbonate, and latex, and wherein the sub-micron calcium carbonate has a particle size in a range of about 200 nm to about 800 nm and is present in an amount of at least about 0.1 gallons per 94-pound sack of the cement; and
allowing the cement composition to set in the space.

15. The method of claim 14 wherein the sub-micron calcium carbonate comprises a colloidal suspension in a base fluid.

16. The method of claim 14 wherein the cement composition further comprises at least one additive selected from the group consisting of a latex stabilizer, a strength-retrogression additive, a set accelerator, a set retarder, a weighting agent, a lightweight additive, a gas-generating additive, a mechanical property enhancing additive, a lost-circulation material, a filtration-control additive, a fluid loss control additive, a dispersant, a defoaming agent, a foaming agent, a thixotropic additive, and combinations thereof.

17. The method of claim 14 wherein the cement composition further comprises at least one additive selected from the group consisting of crystalline silica, amorphous silica, fumed silica, a salt, a fiber, a hydratable clay, calcined shale, vitrified shale, a microsphere, fly ash, slag, diatomaceous earth, metakaolin, rice husk ash, natural pozzolan, zeolite, cement kiln dust, lime, an elastomers, a resin, and combinations thereof.

18. The method of claim 14 wherein the latex comprises a water-in-oil emulsion that comprises styrene-butadiene rubber.

19. The method of claim 14 further comprising introducing the conduit into the subterranean formation.

20. The method of claim 1 wherein the sub-micron calcium carbonate is present in an amount in the range of about 0.8% to about 3% by weight of the cement on a dry basis.

\* \* \* \* \*